Patented July 27, 1926.

1,593,959

UNITED STATES PATENT OFFICE.

JAMES A. WADE, OF DETROIT, MICHIGAN.

CLEANSING COSMETIC LOTION.

No Drawing.   Application filed May 10, 1923. Serial No. 638,093.

This invention has as its object to provide a face lotion of novel composition.

The invention contemplates the provision of a face lotion which will prove highly efficient in cleansing and clearing the skin and in keeping the pores of the skin free from accumulations.

The composition comprises a mixture of the following ingredients in about the proportions stated:

| | Ounces. |
|---|---|
| Cucumber juice | 2 |
| Tincture of benzoin | 1½ |
| Cologne spirits | 1 |
| Elder flower water | 5½ |
| Potassium nitrate (saltpeter) | ½ |

The composition is prepared by adding the potassium nitrate to the tincture of benzoin and agitating the mixture, afterwards straining the same through a cheese cloth. To this mixture are added the other ingredients which have previously been combined, and the final mixture is then allowed to stand, in a vessel immersed in warm water, for about three minutes after which the composition is ready for use.

In the use of the composition, it is rubbed on the face both night and morning, after the face has been washed with hot water. It will be found that the composition will be efficient in clearing and cleansing the skin and that it will remove and prevent accumulations of foreign matter in the pores.

Having thus described the invention, what is claimed as new is:—

A cleansing cosmetic lotion comprising a composition of cucumber juice and tincture of benzoin in approximately equal parts, and potassium nitrate, together with cologne spirits and elder flower water in amount sufficient to form an appropriate vehicle.

In testimony whereof I affix my signature.

JAMES A. WADE.